(12) United States Patent
Choi et al.

(10) Patent No.: US 10,019,121 B2
(45) Date of Patent: Jul. 10, 2018

(54) DISPLAY DEVICE

(71) Applicant: SAMSUNG DISPLAY CO., LTD., Yongin-si, Gyeonggi-do (KR)

(72) Inventors: Chung Sock Choi, Seoul (KR); Sang Hwan Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 23 days.

(21) Appl. No.: 14/931,550

(22) Filed: Nov. 3, 2015

(65) Prior Publication Data

US 2016/0282987 A1    Sep. 29, 2016

(30) Foreign Application Priority Data

Mar. 24, 2015   (KR) .................. 10-2015-0040852

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC ................... G06F 3/044; G06F 3/0412; G06F 2203/04103
See application file for complete search history.

(56) References Cited

U.S. PATENT DOCUMENTS

| 9,048,459 | B2 * | 6/2015 | Cho ................ H01L 51/5256 |
| 2012/0313877 | A1 * | 12/2012 | Han ................ G06F 3/041 345/173 |
| 2013/0065476 | A1 * | 3/2013 | Kim ................ H01L 51/5262 445/25 |
| 2013/0278513 | A1 * | 10/2013 | Jang ................ G06F 3/044 345/173 |
| 2014/0002973 | A1 * | 1/2014 | Lee ................ H05K 7/00 361/679.01 |
| 2014/0078585 | A1 * | 3/2014 | Kim ................ G09F 9/33 359/513 |
| 2014/0374704 | A1 * | 12/2014 | Jang ................ H01L 51/0097 257/40 |
| 2014/0375538 | A1 * | 12/2014 | Shi ................ G09G 3/2092 345/156 |

(Continued)

FOREIGN PATENT DOCUMENTS

| KR | 10-2012-0047054 A | 5/2012 |
| KR | 10-2014-0037528 A | 3/2014 |
| KR | 10-1373044 B1 | 3/2014 |

(Continued)

*Primary Examiner* — Patrick Edouard
*Assistant Examiner* — Joseph Fox
(74) *Attorney, Agent, or Firm* — Lewis Roca Rothgerber Christie LLP (57) ABSTRACT

Provided is a display device including: a display unit including a pixel and a non-pixel area; an encapsulation unit configured to seal the display unit; a touch sensing electrode at the non-pixel area on the encapsulation unit and provided with a plurality of first openings; and a reflection reducing unit at the pixel and the non-pixel area on the encapsulation unit and configured as a multilayer of a metal layer and a dielectric layer. The metal layer includes a non-pixel portion overlapping the touch sensing electrode and provided with a plurality of second openings.

12 Claims, 8 Drawing Sheets

(56) References Cited

U.S. PATENT DOCUMENTS

2015/0115254 A1* 4/2015 Choi .................... H01L 27/323
          257/40
2015/0362773 A1* 12/2015 Mu .................... G02F 1/13338
          349/12

FOREIGN PATENT DOCUMENTS

| KR | 10-2014-0056498 A | 5/2014 |
| KR | 10-2014-0147199 A | 12/2014 |

* cited by examiner

DISPLAY DEVICE

CROSS-REFERENCE TO RELATED APPLICATION

This application claims priority to and the benefit of Korean Patent Application No. 10-2015-0040852 filed in the Korean Intellectual Property Office on Mar. 24, 2015, the entire content of which is incorporated herein by reference.

BACKGROUND

1. Field

The described technology relates generally to a display device such as, for example, a display device having a touch sensor unit embedded therein.

2. Description of the Related Art

A display device includes a plurality of pixels, and displays an image by combining light emitted from the plurality of pixels. Further, the display device includes a touch sensor unit for a touch detecting function, and should minimize or reduce an increase in thickness due to an addition of the touch sensor unit.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a display device capable of reducing reflection of external light to improve outdoor visibility and minimizing or reducing a change in image quality according to a viewing angle.

An example embodiment provides a display device including: a display unit including a pixel and a non-pixel area; an encapsulation unit configured to seal the display unit; a touch sensing electrode at the non-pixel area on the encapsulation unit and provided with a plurality of first openings; and a reflection reducing unit at the pixel and the non-pixel area on the encapsulation unit and configured as a multilayer of a metal layer and a dielectric layer. The metal layer includes a non-pixel portion overlapping the touch sensing electrode and provided with a plurality of second openings.

The pixel may include an organic light emitting diode, and the encapsulation unit may be configured as a multilayer of an inorganic layer and an organic layer. The display device may further include a spacer on the encapsulation unit, and the touch sensing electrode may be on the spacer. The display device may further include a black layer at the non-pixel area on the encapsulation unit.

The touch sensing electrode may have a mesh shape and include at least one of a low resistance metal and a conductive nano material. Each of the touch sensing electrode and the non-pixel portion of the metal layer may be patterned in a plurality of lines. The plurality of second openings may be at the same positions as the plurality of first openings with the same shape and size as those of the plurality of first openings.

The touch sensing electrode may be covered with a passivation layer. The reflection reducing unit may include a first metal layer, a first dielectric layer, a second metal layer, and a second dielectric layer which are sequentially stacked (e.g., ordered) on the passivation layer. Each of the first metal layer and the second metal layer may include a pixel portion corresponding to the pixel and a non-pixel portion corresponding to the non-pixel area and provided with the plurality of second openings.

On the other hand, the reflection reducing unit may include a first metal layer on the same layer as the touch sensing electrode, a first dielectric layer configured to cover the first metal layer and the touch sensing electrode, a second metal layer on the first dielectric layer, and a second dielectric layer configured to cover the second metal layer.

The first metal layer may include a pixel portion corresponding to the pixel. The second metal layer may include a pixel portion corresponding to the pixel and a non-pixel portion corresponding to the non-pixel area and provided with the plurality of second openings.

On the other hand, each of the first metal layer and the second metal layer may include a pixel portion corresponding to the pixel and a non-pixel portion corresponding to the non-pixel area and provided with the plurality of second openings, and the non-pixel portion of the first metal layer may be directly on the touch sensing electrode.

The display device may further include a transparent adhesive layer and a cover window on the reflection reducing unit. Transmittance of light emitted vertically or substantially vertically from the pixel and passing through the reflection reducing unit may be the same as transmittance of light emitted in a diagonal direction from the pixel and passing through the touch sensing electrode and the reflection reducing unit.

According to an example embodiment, metal layers of a touch sensing electrode and a reflection reducing unit each are provided with a plurality of openings, thereby improving transmittance of light emitted in a diagonal direction from the pixel. Accordingly, the display device can implement a wide viewing angle, and even though the viewing angle becomes large, luminance of the pixel PX is not reduced, such that a change in image quality according to the viewing angle may be minimized or reduced.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Embodiments of the present disclosure will be described more fully hereinafter with reference to the accompanying drawings, in which example embodiments of the disclosure are shown. As those skilled in the art would realize, the described embodiments may be modified in various different ways, all without departing from the spirit or scope of the present invention.

It will be understood that when an element such as a layer, film, region, or substrate is referred to as being "on" another element, it can be directly on the other element or be indirectly on the second elements with one or more intervening elements interposed therebetween. Further, in the specification, the word "on" may refer to positioning on or below the referenced object portion, and is not limited to positioning on the upper side of the referenced object portion based on a gravity direction.

In the specification, unless explicitly described to the contrary, the word "comprise" and variations such as "comprises" or "comprising", will be understood to imply the inclusion of stated elements but not the exclusion of any other elements. In addition, the size and thickness of each configuration shown in the drawings may be arbitrarily shown for understanding and ease of description, and therefore, the present disclosure is not necessarily limited thereto.

Figure 1:
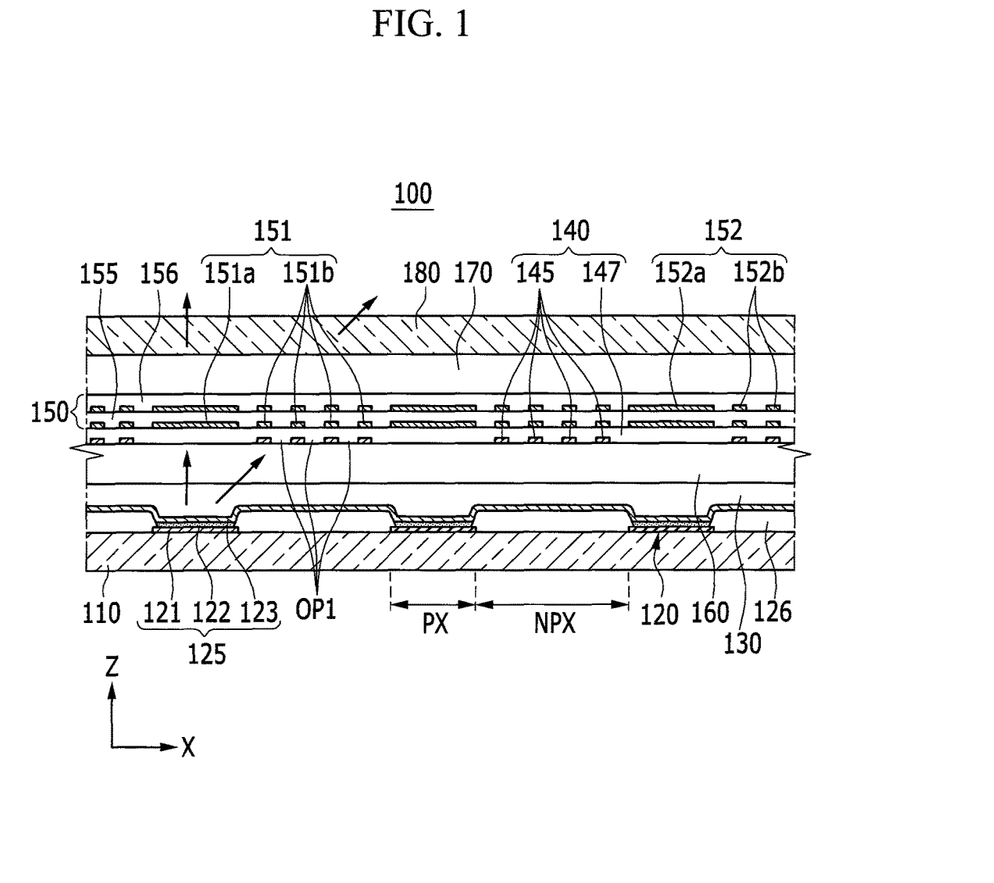
FIG. 1 is a partially enlarged cross-sectional view of a display device according to a first example embodiment.

FIG. 1 is a partially enlarged cross-sectional view of a display device according to a first example embodiment.

Referring to FIG. 1, a display device 100 according to the first example embodiment includes a substrate 110, a display unit 120 on or formed on the substrate 110, an encapsulation unit 130 encapsulating the display unit 120, and a touch sensor unit 140 and a reflection reducing unit 150 which are above or formed above the encapsulation unit 130. Further, the display device 100 according to the first example embodiment may further include a spacer 160 between or formed between the encapsulation unit 130 and the touch sensor unit 140, and a transparent adhesive layer 170 and a cover window 180 which are on or formed on the reflection reducing unit 150.

The substrate 110 may be a hard substrate including or made of glass, quartz, ceramic, or plastic, or a flexible substrate including or made of an organic material such as polyimide, polycarbonate, polyethylene, polyethylene terephthalate, and/or polyacrylate.

The display unit 120 includes a plurality of pixels PX and displays an image by combining light emitted from the plurality of pixels PX. The display unit 120 may include a red pixel, a green pixel, and a blue pixel, and further include a white pixel as necessary or desired. Since the plurality of pixels PX are positioned to be spaced apart from each other, the display unit 120 includes a non-pixel area NPX between the plurality of pixels PX.

Each pixel PX may include or be configured by a driving circuit unit and an organic light emitting diode 125. The driving circuit unit includes at least two thin film transistors and at least one capacitor and controls a light emission of the organic light emitting diode 125. The organic light emitting diode 125 includes a pixel electrode 121, an emission layer 122, and a common electrode 123. The pixel electrode 121 is at or formed in each pixel PX, and the common electrode 123 is on or formed on the entire or substantially the entire display unit 120 regardless of pixels. A pixel defining layer (or a partition wall) 126 that defines an emission area of the organic light emitting diode 125 may be on or formed on the substrate 110.

Any one of the pixel electrode 121 and the common electrode 123 injects electrons to the emission layer 122, and the other one of the pixel electrode 121 and the common electrode 123 injects holes to the emission layer 122. The electrons and the holes are combined in the emission layer 122 to generate excitons, and light is emitted by energy generated when the excitons are dropped from an excited state to a ground state.

The pixel electrode 121 may include or be formed of a reflective layer, and the common electrode 123 may include or be formed of a transparent layer or a translucent layer. The light emitted from the emission layer 122 is reflected by the pixel electrode 121, and penetrates the common electrode 123 to be released to the outside. When the common electrode 123 includes or is formed of the translucent layer, a part of the light reflected by the pixel electrode 121 is re-reflected by the common electrode 123 to form a resonance structure, thereby enhancing light extraction efficiency.

Figure 2:
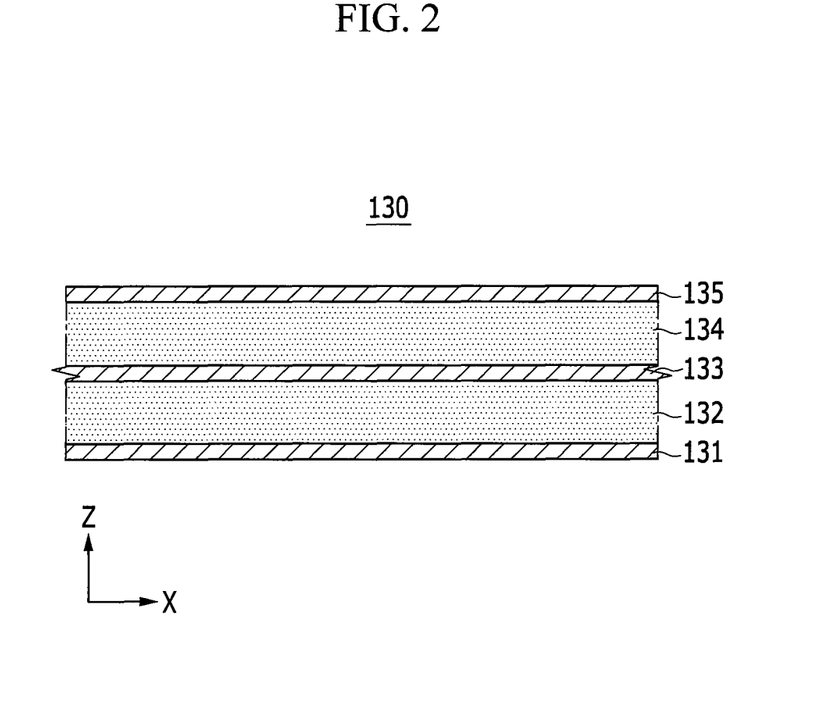
FIG. 2 is an enlarged cross-sectional view of an encapsulation unit of the display device illustrated in FIG. 1.

Since the organic light emitting diode 125 is vulnerable to moisture and oxygen, the encapsulation unit 130 seals the organic light emitting diode 125 to prevent or substantially inhibit moisture and oxygen from permeating into the organic light emitting diode 125. FIG. 2 is an enlarged cross-sectional view of the encapsulation unit of the display device illustrated in FIG. 1. Referring to FIG. 2, the encapsulation unit 130 may be configured as a multilayer of an inorganic layer and an organic layer.

For example, the encapsulation unit 130 includes or basically includes a first inorganic layer 131 covering the common electrode 123, a first organic layer 132 on or formed on the first inorganic layer 131, and a second inorganic layer 133 on or formed on the first organic layer 132. The encapsulation unit 130 may further include a second organic layer 134 on or formed on the second inorganic layer 133 and a third inorganic layer 135 on or formed on the second organic layer 134, and an additional organic layer and an additional inorganic layer may be further on or formed on the third inorganic layer 135.

The inorganic layers 131, 133, and 135 included in the encapsulation unit 130 prevent or substantially inhibit moisture and oxygen from permeating into the organic light emitting diode 125. The organic layers 132 and 134 included in the encapsulation unit 130 serve to alleviate stress of the inorganic layers 131 and 133 and cover the inorganic layers 131 and 133 in a flat state by filling cracks and pinholes (e.g., defects) in or formed in the inorganic layers 131 and 133.

In embodiments of the present disclosure, a case where the display unit 120 includes the organic light emitting diode 125 is illustrated as an example, but a configuration of the pixel PX of the display unit 120 is not limited thereto.

Referring back to FIG. 1, the touch sensor unit 140 is on or formed on the encapsulation unit 130. The touch sensor unit 140 may be directly on or formed directly on the encapsulation unit 130 or on the spacer 160. In FIG. 1, a second case is illustrated as an example. The spacer 160 is positioned between the encapsulation unit 130 and the touch sensor unit 140, and the spacer 160 reduces electrical interference between the display unit 120 (for example, the common electrode 123) and the touch sensor unit 140.

Figure 3:
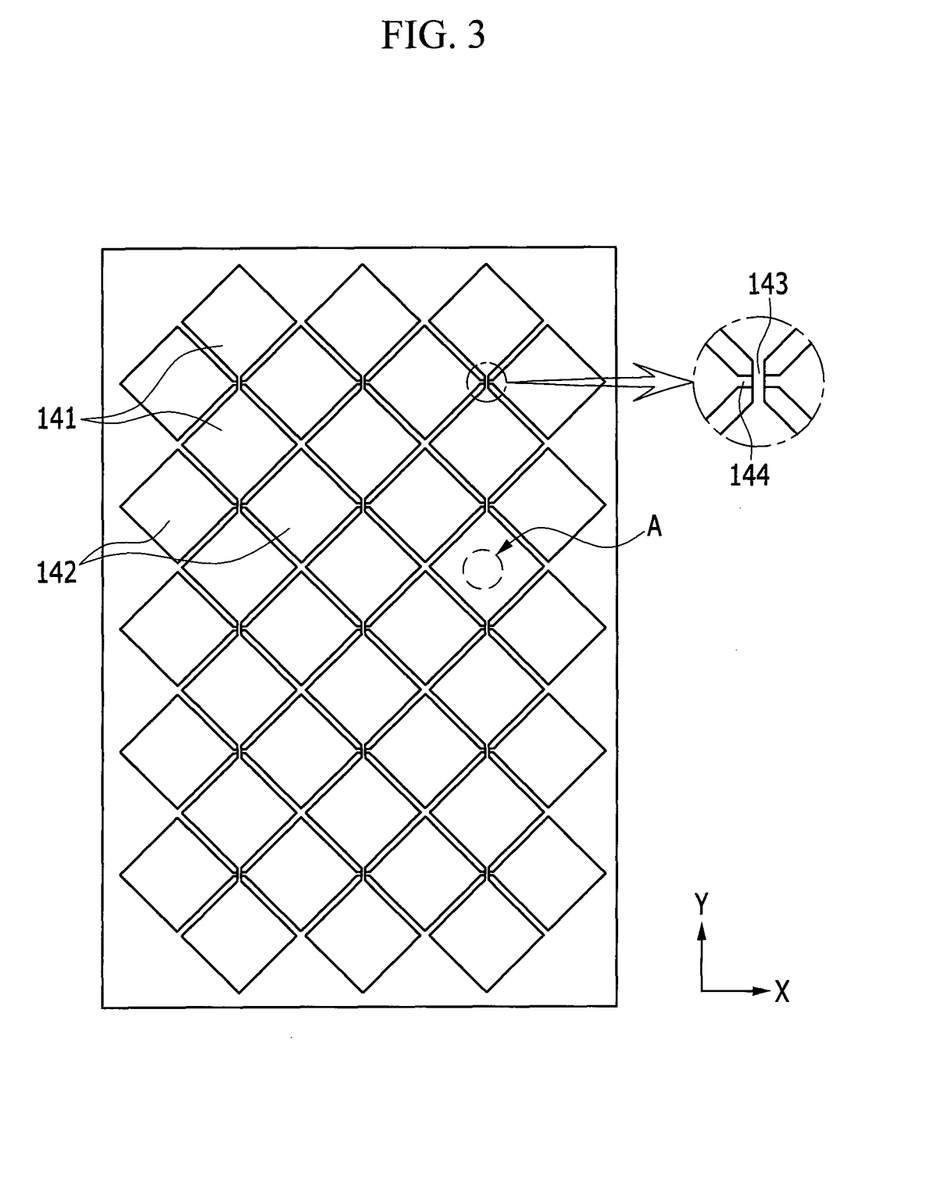
FIG. 3 is a top plan view of a touch sensor unit of the display device illustrated in FIG. 1.
Figure 4:
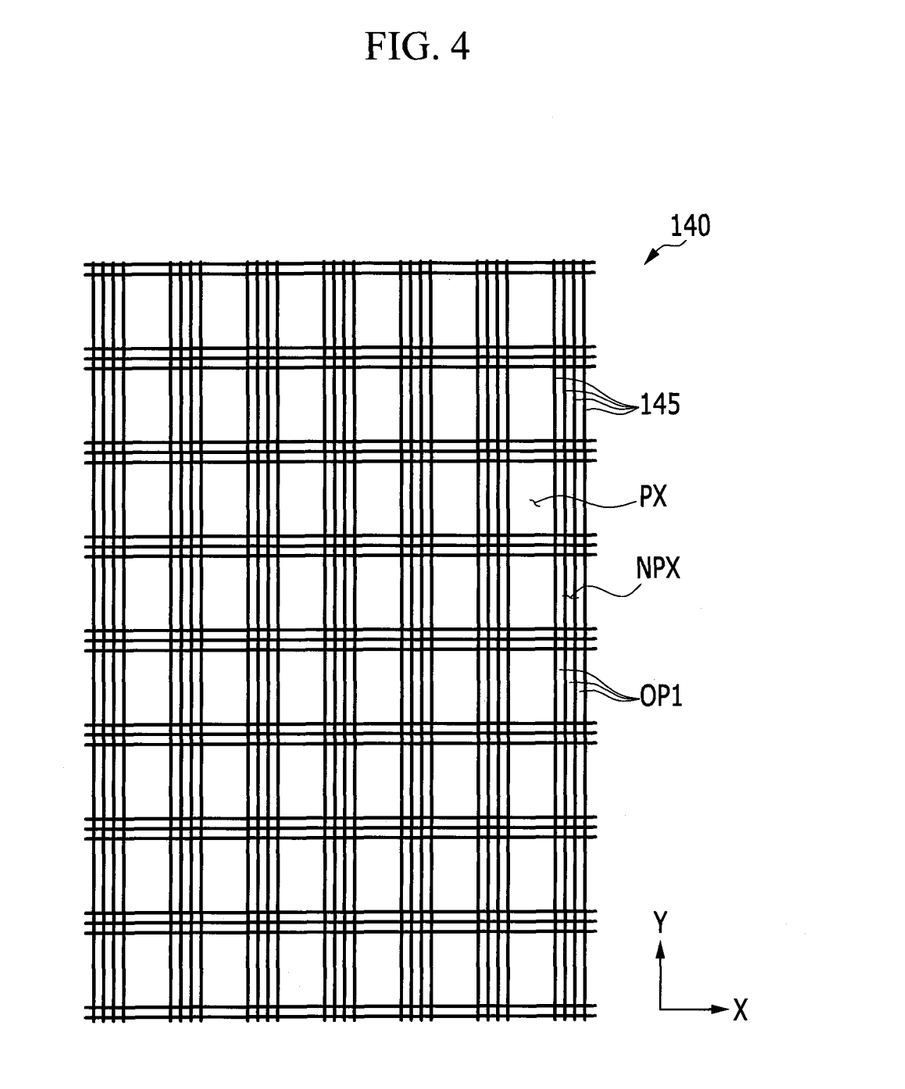
FIG. 4 is an enlarged view of region A of FIG. 3.

FIG. 3 is a top plan view of a touch sensor unit of the display device illustrated in FIG. 1, and FIG. 4 is an enlarged view of region A of FIG. 3.

Referring to FIGS. 3 and 4, the touch sensor unit 140 includes a plurality of first sensing cells 141 arranged in parallel or substantially in parallel to a first direction (y-axis direction) and a plurality of second sensing cells 142 arranged in parallel or substantially in parallel to a second direction (x-axis direction). The first sensing cell 141 and the second sensing cell 142 may be shaped like a rhombus or substantially a rhombus, but are not limited to the illustrated examples. A connection portion 143 of the first sensing cell 141 and a connection portion 144 of the second sensing cell 142 are insulated from each other by an insulating layer.

The touch sensor unit 140 may be configured in a self-capacitance type (or kind) or a mutual capacitance type (or kind), and the touch sensor unit 140 may sense a change in capacitance of the first sensing cell 141 and/or the second sensing cell 142 by a touch of a user to detect a touch position.

Each of the first sensing cell 141 and the second sensing cell 142 includes a touch sensing electrode 145 formed in or having a mesh shape. The touch sensing electrode 145 may include a low resistance metal such as silver (Ag), aluminum (Al), copper (Cu), chromium (Cr), and nickel (Ni), or a conductive nano material such as a silver (Ag) nanowire, and carbon nanotube (CNT).

The touch sensing electrode 145 including or formed of the metal or conductive nano material has lower resistance than a touch sensing electrode including or formed of a transparent conductive layer made of indium tin oxide (ITO) to thereby reduce an resistive-capacitive (RC) delay, and has excellent flexibility, such that cracks are not easily generated even due to repetitive deformation such as bending.

The touch sensing electrode 145 is at or formed in the non-pixel area NPX so as not to block the light emitted from the pixel PX, and is provided with a plurality of openings OP1 so that a part or portion of the light proceeding in a diagonal direction from the pixel PX may be transmitted. For example, the touch sensing electrode 145 may be patterned in a plurality of fine lines in the non-pixel area NPX, and provided with a plurality of slit-shaped openings OP1 through which light passes between the fine lines. The openings OP1 of the touch sensing electrode 145 are referred to as first openings for convenience.

Referring back to FIG. 1, the touch sensor unit 140 includes a passivation layer 147 covering the touch sensing electrode 145. The passivation layer 147 may include or be formed of a transparent dielectric material, and planarizes the surface of the touch sensor unit 140.

The reflection reducing unit 150 is on or formed on the touch sensor unit 140. External light incident to the display unit 120 is reflected by the pixel electrode 121, and thus, is mixed with the light emitted from the pixel PX. The reflection reducing unit 150 serves to improve a contrast of a screen and outdoor visibility by reducing reflection of external light.

For a general technique to reduce reflection of external light, a circular polarizer including a linear polarizer and a phase retardation film is used. However, the publicly known circular polarizer has a considerable thickness and low light efficiency (e.g., low light transmittance). The reflection reducing unit 150 according to the present example embodiment is configured as a multilayer of a metal layer and a dielectric layer and has a total thickness of less than about 1 μm, such that the thickness may be considerably decreased as compared to the above-referenced circular polarizer, and the light efficiency (e.g., light transmittance) may be improved.

For example, the reflection reducing unit 150 is configured such that a plurality of metal layers 151 and 152 and a plurality of dielectric layers 155 and 156 are alternately stacked (e.g., alternately stacked or ordered one by one). For example, the reflection reducing unit 150 may be formed as a multilayer of the first metal layer 151, the first dielectric layer 155, the second metal layer 152, and the second dielectric layer 156. The configuration of the reflection reducing unit 150 is not limited to the above-mentioned example, however, and may further include an additional metal layer and an additional dielectric layer.

Each of the first metal layer 151 and the second metal layer 152 may include one metal or an alloy of two or more selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), and platinum (Pt). The first metal layer 151 and the second metal layer 152 may each have a thickness of several tens of nanometers (nm).

Each of the first dielectric layer 155 and the second dielectric layer 156 may include one or two or more materials selected from the group consisting of silicon dioxide ($SiO_2$), titanium dioxide ($TiO_2$), zirconium dioxide ($ZrO_2$), hafnium oxide ($HfO_2$), aluminum oxide ($Al_2O_3$), zinc oxide (ZnO), yttrium oxide ($Y_2O_3$), beryllium oxide (BeO), magnesium oxide (MgO), lead dioxide ($PbO_2$), tungsten trioxide ($WO_3$), silicon nitride, and aluminum nitride (AlN). Each of the first dielectric layer 155 and the second dielectric layer 156 may have a thickness of several tens to several hundreds of nm.

The first metal layer 151 and the second metal layer 152 may be formed by methods such as, for example, sputtering, chemical vapor deposition, and physical vapor deposition. The first dielectric layer 155 and the second dielectric layer 156 may be formed by methods such as, for example, sputtering, chemical vapor deposition, plasma chemical vapor deposition, and thermal deposition. Materials of the first and second metal layers 151 and 152 and the first and second dielectric layers 155 and 156 are not limited to the examples, and the manufacturing method is also not limited to the examples.

The first and second metal layers 151 and 152 absorb some of the incident external light, reflect others (e.g., reflect other portions of the incident external light), and transmit the others (e.g., transmit still other portions (the remaining portion) of the incident external light). The external light reflected by the first and second metal layers 151 and 152 becomes extinct due to an optical destructive interference phenomenon with the first and second metal layers 151 and 152 and the first and second dielectric layers 155 and 156. The reflection reducing unit 150 absorbs a part of the external light by using optical absorption and the optical destructive interference phenomenon of the first and second metal layers 151 and 152.

Figure 5:
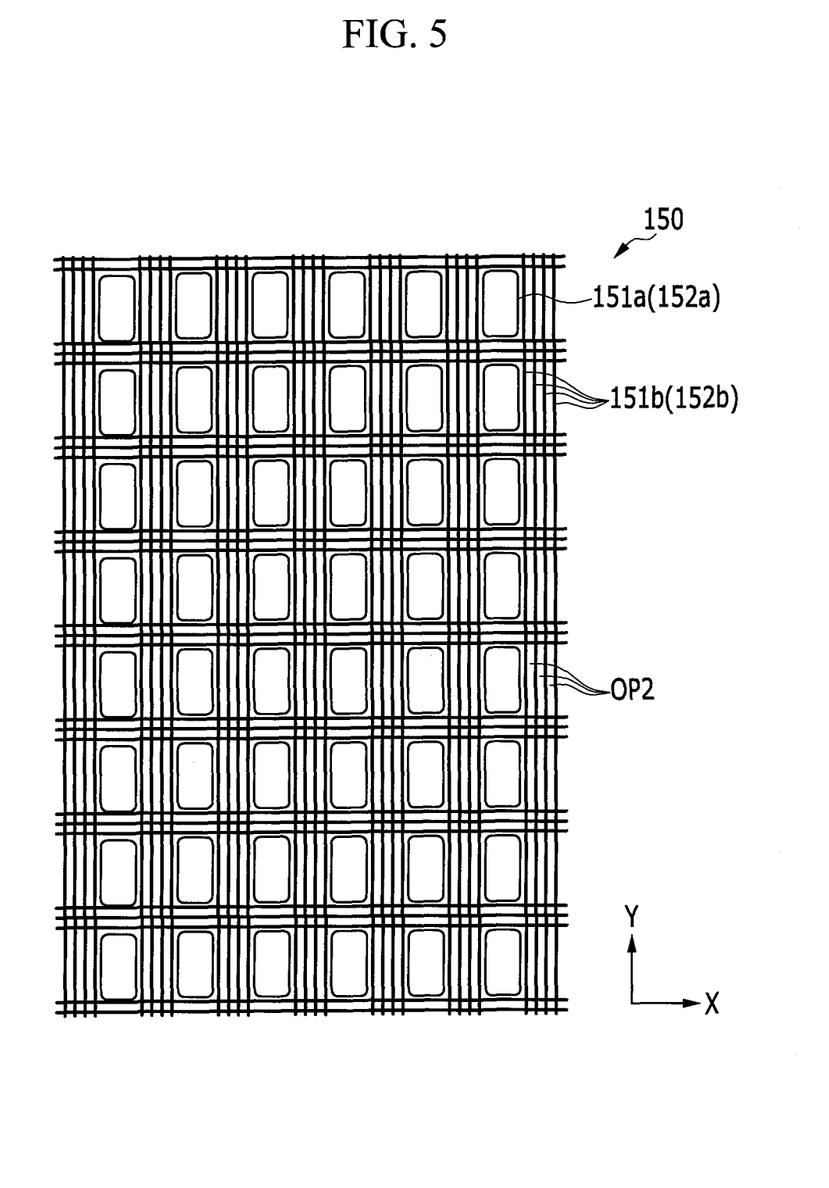
FIG. 5 is a partial top plan view of a reflection reducing unit of the display device illustrated in FIG. 1.

FIG. 5 is a partial top plan view of the reflection reducing unit of the display device illustrated in FIG. 1.

Referring to FIGS. 1 and 5, each of the first and second metal layers 151 and 152 included in the reflection reducing unit includes a pixel portion 151a or 152a corresponding to the pixel PX and a non-pixel portion 151b or 152b corresponding to the non-pixel area NPX. The pixel portions 151a and 152a may be shaped like an isolated island which is the same or substantially the same shape as the pixel PX.

The non-pixel portions 151b and 152b overlap the touch sensing electrode 145, and have or are provided with a plurality of openings OP2 so that a part of the light proceeding in a diagonal direction from the pixel PX may be transmitted (e.g., transmitted to the outside). For example, the non-pixel portions 151b and 152b of the first and second metal layers 151 and 152 may be patterned in a plurality of fine lines, and provided with a plurality of slit-shaped openings OP2 through which light passes between the fine lines. The openings OP2 of the non-pixel portions 151b and 152b are referred to as second openings for convenience.

The second openings OP2 of the non-pixel portions 151*b* and 152*b* may be formed at the same or substantially the same positions as the first openings OP1 of the touch sensing electrode 145 with the same or substantially the same shape and size as those of the first openings OP1. For example, the first openings OP1 do not overlap or substantially do not overlap the non-pixel portions 151*b* and 152*b* in a thickness direction (z-axis direction) of the display device 100, and the second openings OP2 do not overlap or substantially do not overlap the touch sensing electrode 145. The non-pixel portions 151*b* and 152*b* may exactly or substantially exactly overlap the touch sensing electrode 145 without being misaligned from the touch sensing electrode 145.

The light generated by the pixel PX sequentially penetrates the encapsulation unit 130, the spacer 160, the touch sensor unit 140, the reflection reducing unit 150, the transparent adhesive layer 170, and the cover window 180 to be released to the outside of the display device 100. Light proceeding in a vertical or substantially vertical direction from the pixel PX is partially absorbed while passing through the reflection reducing unit 150. Final transmittance of the light proceeding in the vertical or substantially vertical direction from the pixel PX may be about 50% to 60% (e.g., may have an intensity of about 50% to 60% of the initial intensity produced at the pixel PX).

Some of the light proceeding in the diagonal direction from the pixel PX is blocked or reduced by the touch sensing electrode 145, and the others (e.g., other portions of the light) pass through the first opening OP1 of the touch sensing electrode 145 and the second openings OP2 of the non-pixel portions 151*b* and 152*b* to be then released to the outside of the display device 100. Final transmittance of the light proceeding in the diagonal direction from the pixel PX may also be about 50% to 60% (e.g., may have an intensity of about 50% to 60% of the initial intensity produced at the pixel PX). For convenience, the light proceeding in the vertical or substantially vertical direction from the pixel PX is referred to as a first component, and the light proceeding in the diagonal direction is referred to as a second component.

The final transmittance of the first component is determined by the reflection reducing unit 150, and the touch sensing electrode 145 and the non-pixel portions 151*b* and 152*b* may adjust the sizes of the first and second openings OP1 and OP2 so that the final transmittance of the second component is the same or substantially the same as that of the first component. For example, the sizes of the first and second openings OP1 and OP2 may be configured such that the final transmittance of the second component is the same or substantially the same as that of the first component.

The final transmittance of the second component being the same or substantially the same as that of the first component means that transmittance of light emitted at all or substantially all angles is the same or substantially the same (e.g., the intensity of light transmitted to the outside is the same or substantially the same at all or substantially all angles relative to the pixel PX). Therefore, the display device 100 according to the first example embodiment may implement a wide viewing angle, and even though the viewing angle becomes large, luminance of the pixel PX is not reduced or is not substantially reduced, such that a change in image quality according to the viewing angle may be minimized or reduced.

When it is assumed that the reflection reducing unit 150 is not provided with the second opening OP2, about half of the light passing through the first opening OP1 of the touch sensing electrode 145 is absorbed by the reflection reducing unit 150. For example, the final transmittance of the second component may be about 25% to 30% (e.g., 25% to 30% of the initial intensity produced at the pixel). In this case, as the viewing angle is increased, luminance of the pixel is greatly reduced, and as a result, deterioration in image quality is caused by increase in the viewing angle.

Figure 6:
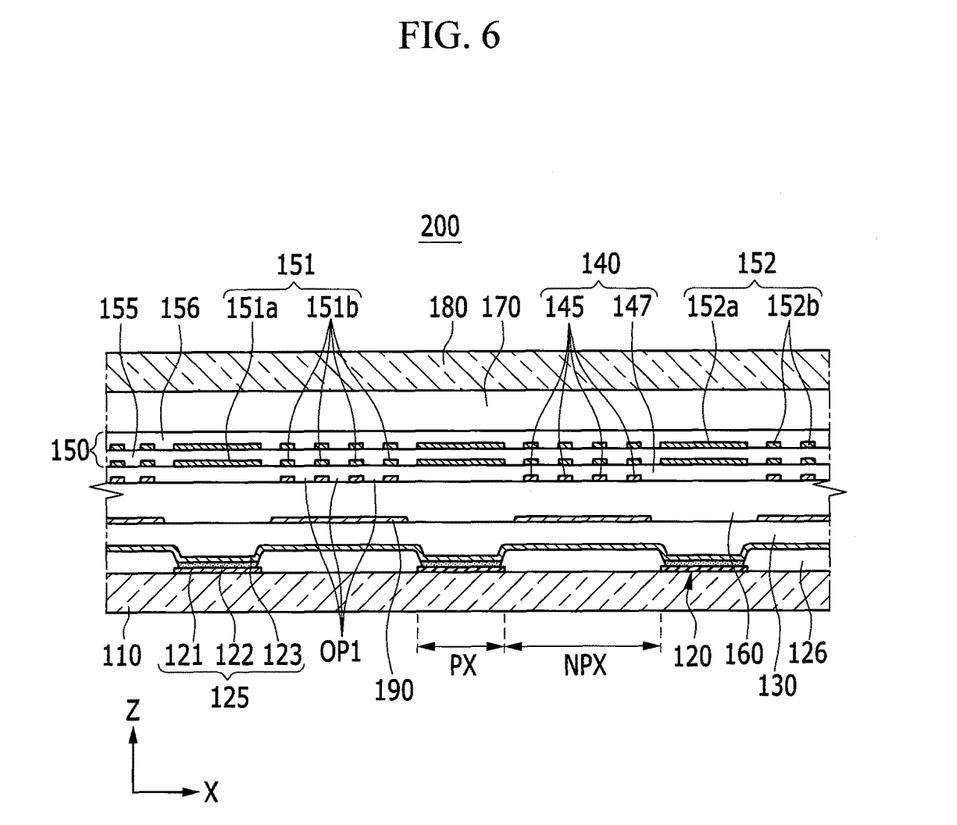
FIG. 6 is a partially enlarged cross-sectional view of a display device according to a second example embodiment.

FIG. 6 is a partially enlarged cross-sectional view of a display device according to a second example embodiment.

Referring to FIG. 6, the display device 200 according to the second example embodiment includes a black layer 190 corresponding to the non-pixel area NPX. The black layer 190 may be directly on or formed directly on the encapsulation unit 130 with the same or substantially the same shape and size as those of the non-pixel area NPX. The black layer 190 absorbs external light incident to the non-pixel area NPX, and may be formed of a polymer material including carbon black, black dye, and/or a metal.

The configuration other than the black layer 190 in the display device 200 according to the second example embodiment is the same as that of the first example embodiment.

Figure 7:
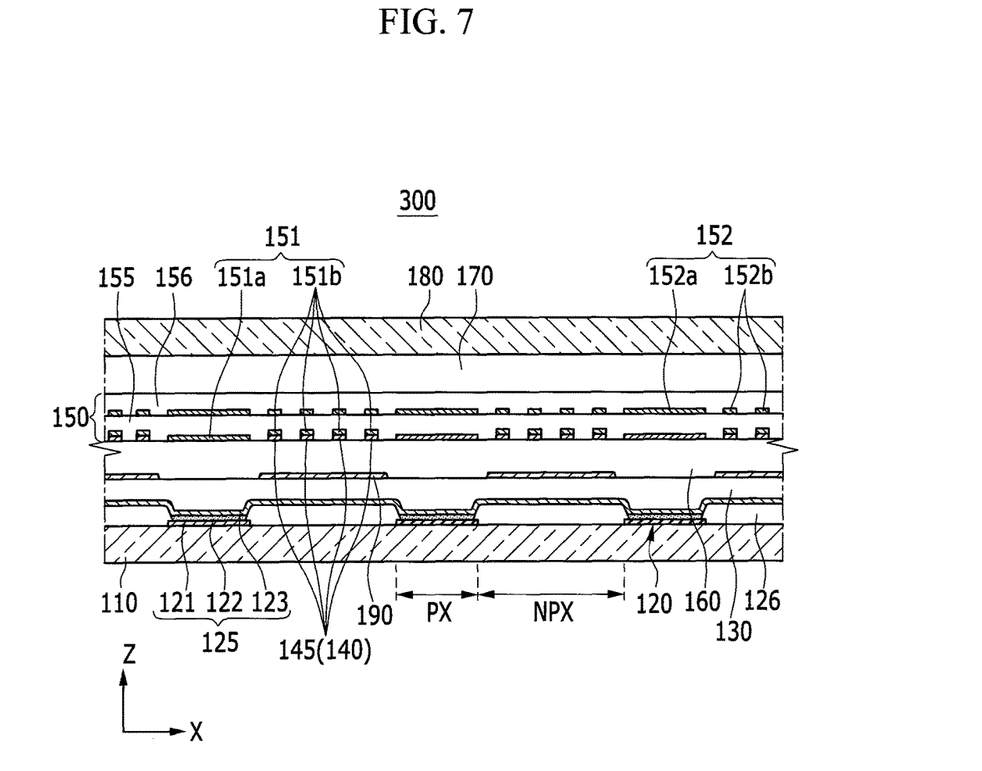
FIG. 7 is a partially enlarged cross-sectional view of a display device according to a third example embodiment.

FIG. 7 is a partially enlarged cross-sectional view of a display device according to a third example embodiment.

Referring to FIG. 7, in the display device 300 according to the third example embodiment, a touch sensing electrode 145 is not covered with the passivation layer, which has been described with respect to the first example embodiment. And, a pixel portion 151*a* of a first metal layer 151 is on or formed on the same layer as the touch sensing electrode 145, for example, on a spacer 160, and a non-pixel portion 151*b* of the first metal layer 151 is directly on or formed directly on the touch sensing electrode 145.

The first metal layer 151 of a reflection reducing unit 150 includes the pixel portion 151*a*, which corresponds to the pixel PX and is on or formed on the same layer as the touch sensing electrode 145, and the non-pixel portion 151*b*, which is directly on or formed directly on the touch sensing electrode 145. The touch sensing electrode 145 and the first metal layer 151 are covered with a first dielectric layer 155. The first metal layer 151 is directly on or formed directly on the spacer 160 and the touch sensing electrode 145, thereby further simplifying the configuration and manufacture of the display device 300.

The configuration other than the touch sensor unit 140 and the reflection reducing unit 150 in the display device 300 according to the third example embodiment is the same as that of the first example embodiment or the second example embodiment. FIG. 7 illustrates the basic structure of the second example embodiment.

Figure 8:
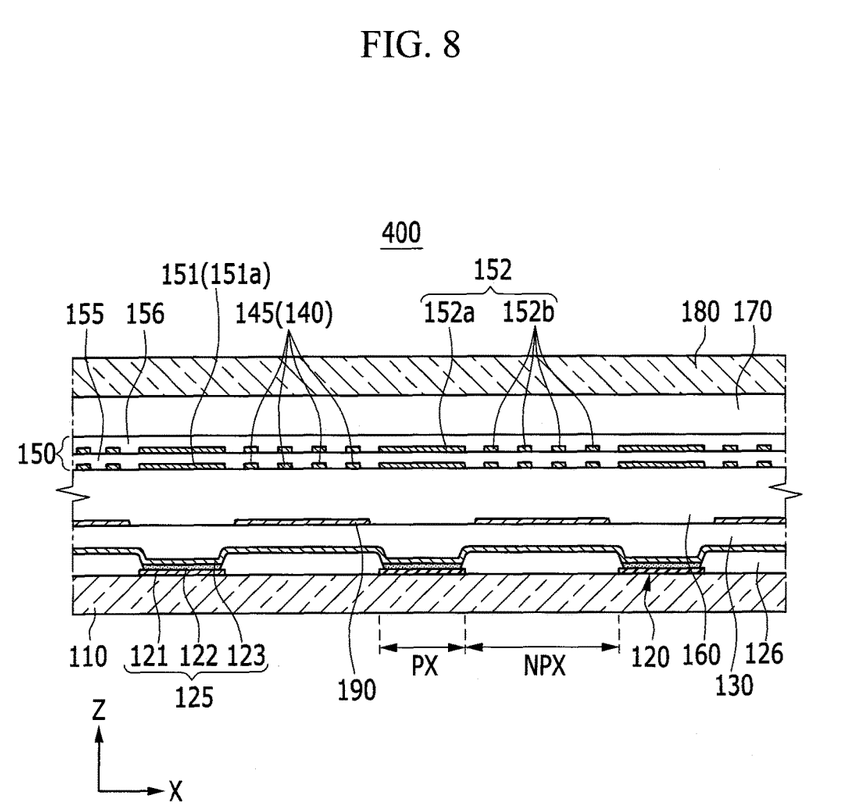
FIG. 8 is a partially enlarged cross-sectional view of a display device according to a fourth example embodiment.

FIG. 8 is a partially enlarged cross-sectional view of a display device according to a fourth example embodiment.

Referring to FIG. 8, in a display device 400 according to the fourth example embodiment, a touch sensing electrode 145 is not covered with the passivation layer which has been described with respect to the first example embodiment. And, a first metal layer 151 does not include the non-pixel portion, which has been described with respect to the first example embodiment, and a pixel portion 151*a* of the first metal layer 151 is on or formed on the same layer as the touch sensing electrode 145, for example, on a spacer 160.

The entire or substantially the entire first metal layer 151 is the pixel portion 151*a* corresponding to the pixel and is positioned on the spacer 160 at a set or predetermined distance from the touch sensing electrode 145. The passivation layer of the touch sensor unit and the non-pixel portion of the first metal layer, which have been described with respect to the first example embodiment, are omitted, thereby further simplifying the configuration and manufacture of the display device 400.

The configuration other than the touch sensor unit 140 and the reflection reducing unit 150 in the display device according to the fourth example embodiment is the same as that of the first example embodiment or the second example embodiment. FIG. 8 illustrates the basic structure of the second example embodiment.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device comprising:
    a display unit comprising a pixel and a non-pixel area disposed between the pixels adjacent to each other;
    an encapsulation unit that seals the display unit;
    a touch sensing electrode on the encapsulation unit at the non-pixel area and having a plurality of first openings disposed at the non-pixel area; and
    a reflection reducing unit on the encapsulation unit at the pixel and at the non-pixel area, the reflection reducing unit being a multilayer of a metal layer and a dielectric layer,
    wherein the metal layer comprises a non-pixel portion overlapping the touch sensing electrode and having a plurality of second openings disposed at the non-pixel portion,
    wherein each of the touch sensing electrode and the non-pixel portion of the metal layer is patterned to have a plurality of lines, and
    wherein the plurality of second openings is at the same positions as the plurality of first openings and has the same shape and size as those of the plurality of first openings.

2. The display device of claim 1, wherein:
    the pixel comprises an organic light emitting diode, and
    the encapsulation unit is a multilayer of an inorganic layer and an organic layer.

3. The display device of claim 2, further comprising:
    a spacer on the encapsulation unit,
    wherein the touch sensing electrode is on the spacer.

4. The display device of claim 2, further comprising:
    a black layer on the encapsulation unit at the non-pixel area.

5. The display device of claim 1, wherein:
    the touch sensing electrode has a mesh shape, and comprises at least one selected from a low resistance metal and a conductive nano material.

6. The display device of claim 1, wherein:
    the touch sensing electrode is covered with a passivation layer, and
    the reflection reducing unit comprises a first metal layer, a first dielectric layer, a second metal layer, and a second dielectric layer which are sequentially stacked on the passivation layer.

7. The display device of claim 6, wherein:
    each of the first metal layer and the second metal layer comprises a pixel portion corresponding to the pixel, comprises a non-pixel portion corresponding to the non-pixel area, and has the plurality of second openings.

8. The display device of claim 1, wherein:
    the reflection reducing unit comprises:
        a first metal layer on the same layer as the touch sensing electrode,
        a first dielectric layer that covers the first metal layer and the touch sensing electrode,
        a second metal layer on the first dielectric layer, and
        a second dielectric layer that covers the second metal layer.

9. The display device of claim 8, wherein:
    the first metal layer comprises a pixel portion corresponding to the pixel, and
    the second metal layer comprises a pixel portion corresponding to the pixel, comprises a non-pixel portion corresponding to the non-pixel area, and has the plurality of second openings.

10. The display device of claim 8, wherein:
    each of the first metal layer and the second metal layer comprises a pixel portion corresponding to the pixel, comprises a non-pixel portion corresponding to the non-pixel area, and has the plurality of second openings, and
    the non-pixel portion of the first metal layer is directly on the touch sensing electrode.

11. The display device of claim 1, further comprising:
    a transparent adhesive layer and a cover window on the reflection reducing unit.

12. The display device of claim 1, wherein:
    transmittance of light emitted vertically from the pixel and passing through the reflection reducing unit is the same as transmittance of light emitted in a diagonal direction from the pixel and passing through the touch sensing electrode and the reflection reducing unit.

* * * * *